(12) United States Patent
Cheng

(10) Patent No.: US 11,717,913 B2
(45) Date of Patent: Aug. 8, 2023

(54) METHOD AND SYSTEM FOR FUSING PIPE SEGMENTS

(71) Applicant: Paul Po Cheng, London (CA)

(72) Inventor: Paul Po Cheng, London (CA)

(*) Notice: Subject to any disclaimer, the term of this patent is extended or adjusted under 35 U.S.C. 154(b) by 0 days.

(21) Appl. No.: 17/859,142

(22) Filed: Jul. 7, 2022

(65) Prior Publication Data

US 2022/0339732 A1    Oct. 27, 2022

Related U.S. Application Data

(62) Division of application No. 16/992,230, filed on Aug. 13, 2020, now Pat. No. 11,413,699.

(60) Provisional application No. 62/889,634, filed on Aug. 21, 2019.

(51) Int. Cl.
| | |
|---|---|
| *B23K 20/00* | (2006.01) |
| *B23K 20/02* | (2006.01) |
| *F16L 13/02* | (2006.01) |
| *B23K 101/06* | (2006.01) |

(52) U.S. Cl.
CPC ............ *B23K 20/023* (2013.01); *F16L 13/02* (2013.01); *B23K 2101/06* (2018.08)

(58) Field of Classification Search
CPC .. B23K 20/129; B23K 20/12; B23K 2101/06; B23K 13/015; B23K 31/02; B23K 13/00; B23K 13/025; B23K 13/06; B23K 20/023; B23K 20/028; B23K 20/121; B23K 20/14; B23K 20/24; B23K 20/26; B23K 2101/10; B23K 2101/20; B23K 28/02; B23K 31/125
See application file for complete search history.

(56) References Cited

U.S. PATENT DOCUMENTS

| | | | |
|---|---|---|---|
| 3,678,566 A | | 7/1972 | Ellis et al. |
| 3,874,067 A | * | 4/1975 | Toyooka ............. B23K 20/129 |
| | | | 156/304.6 |
| 4,103,815 A | | 8/1978 | Yokokawa et al. |
| 4,555,053 A | | 11/1985 | Persson et al. |
| 4,712,724 A | | 12/1987 | Lebedev et al. |
| 5,208,443 A | | 5/1993 | McGaffigan |
| 5,240,167 A | | 8/1993 | Ferte et al. |
| 5,699,955 A | | 12/1997 | Shimizu et al. |

(Continued)

FOREIGN PATENT DOCUMENTS

WO    WO2016025294 A1    2/2016

*Primary Examiner* — Erin B Saad

(57) ABSTRACT

A system for securing first and second metal workpieces to a central metal workpiece located therebetween. The system includes clamps to secure the first and second metal workpieces in coaxial alignment with the central metal workpiece, which is rotatable about its axis. Heating elements heat opposed ends of the first metal workpiece and the central metal workpiece, and opposed ends of the second metal workpiece and the central metal workpiece, to a hot working temperature. While the opposed ends are at the hot working temperature, the opposed end of the first metal workpiece is urged against the end opposed thereto of the rotating central metal workpiece, while the central metal workpiece rotates. At the same time, the rotating central metal workpiece's end opposed to the second metal workpiece is engaged with the opposed end of the second metal workpiece. The workpieces are allowed to cool, for bonding the opposed ends.

2 Claims, 6 Drawing Sheets

(56) References Cited

U.S. PATENT DOCUMENTS

| | | |
|---|---|---|
| 5,785,805 A | 7/1998 | Fix, Jr. |
| 5,831,252 A | 11/1998 | Shimizu |
| 6,637,642 B1 * | 10/2003 | Lingnau .................. B23K 20/12 |
| | | 219/601 |
| 7,086,960 B2 | 8/2006 | Huang et al. |
| 7,348,523 B2 * | 3/2008 | Slack .................. B23K 13/025 |
| | | 228/115 |
| 7,752,728 B2 | 7/2010 | Schedler et al. |
| 7,931,184 B2 | 4/2011 | Lingnau et al. |
| 8,336,755 B2 | 12/2012 | Bray et al. |
| 8,863,371 B2 | 10/2014 | Brouwer et al. |
| 8,998,067 B2 | 4/2015 | Lehr |
| 9,644,769 B1 * | 5/2017 | Cheng .................. B23K 20/12 |
| 10,155,283 B2 * | 12/2018 | Kimura .................. B23K 20/24 |
| 10,288,193 B2 | 5/2019 | Cheng |
| 11,413,699 B2 * | 8/2022 | Cheng .................. B23K 20/023 |
| 2008/8093420 | 4/2008 | Mauer |
| 2009/0224024 A1 | 9/2009 | Kawaura et al. |
| 2009/0242613 A1 | 10/2009 | Kawaura et al. |
| 2010/0108666 A1 | 5/2010 | Gafri et al. |
| 2011/0284523 A1 | 11/2011 | Hiroyama et al. |
| 2012/0012232 A1 | 1/2012 | Kawaura et al. |

* cited by examiner

METHOD AND SYSTEM FOR FUSING PIPE SEGMENTS

CROSS-REFERENCE TO RELATED APPLICATIONS

This application is a divisional application of U.S. patent application Ser. No. 16/992,230, filed on Aug. 13, 2020, and claims the benefit of U.S. Provisional Patent Application No. 62/889,634, filed on Aug. 21, 2019, the entirety of each of which is hereby incorporated by reference.

FIELD OF THE INVENTION

The present invention is a method and a system for fusing or bonding pipe segments together.

BACKGROUND OF THE INVENTION

Methods of fusing pipe segments, e.g., as disclosed in U.S. Pat. No. 6,637,642 (Lingnau), are known. However, such methods do not appear to be feasible where only one of the pipe segments may be rotated, or where only limited space is available around the pipe or tube segments.

SUMMARY OF THE INVENTION

For the foregoing reasons, there is a need for a method and system for securing first and second workpieces to a coaxially positioned central workpiece therebetween.

In its broad aspect, the invention provides a system for securing first and second metal workpieces to a central metal workpiece located therebetween. The system includes clamps to secure the first and second metal workpieces in coaxial alignment with the central metal workpiece, which is rotatable about its axis. Heating elements heat opposed ends of the first metal workpiece and the central metal workpiece, and opposed ends of the second metal workpiece and the central metal workpiece, to a hot working temperature. While the opposed ends are at the hot working temperature, the opposed end of the first metal workpiece is urged against the end opposed thereto of the rotating central metal workpiece, while the central metal workpiece rotates. At the same time, the rotating central metal workpiece's end opposed to the second metal workpiece is engaged with the opposed end of the second metal workpiece. The workpieces are allowed to cool, for bonding the opposed ends.

BRIEF DESCRIPTION OF THE DRAWINGS

The invention will be better understood with reference to the attached drawings, in which.

DETAILED DESCRIPTION

Figure 1:
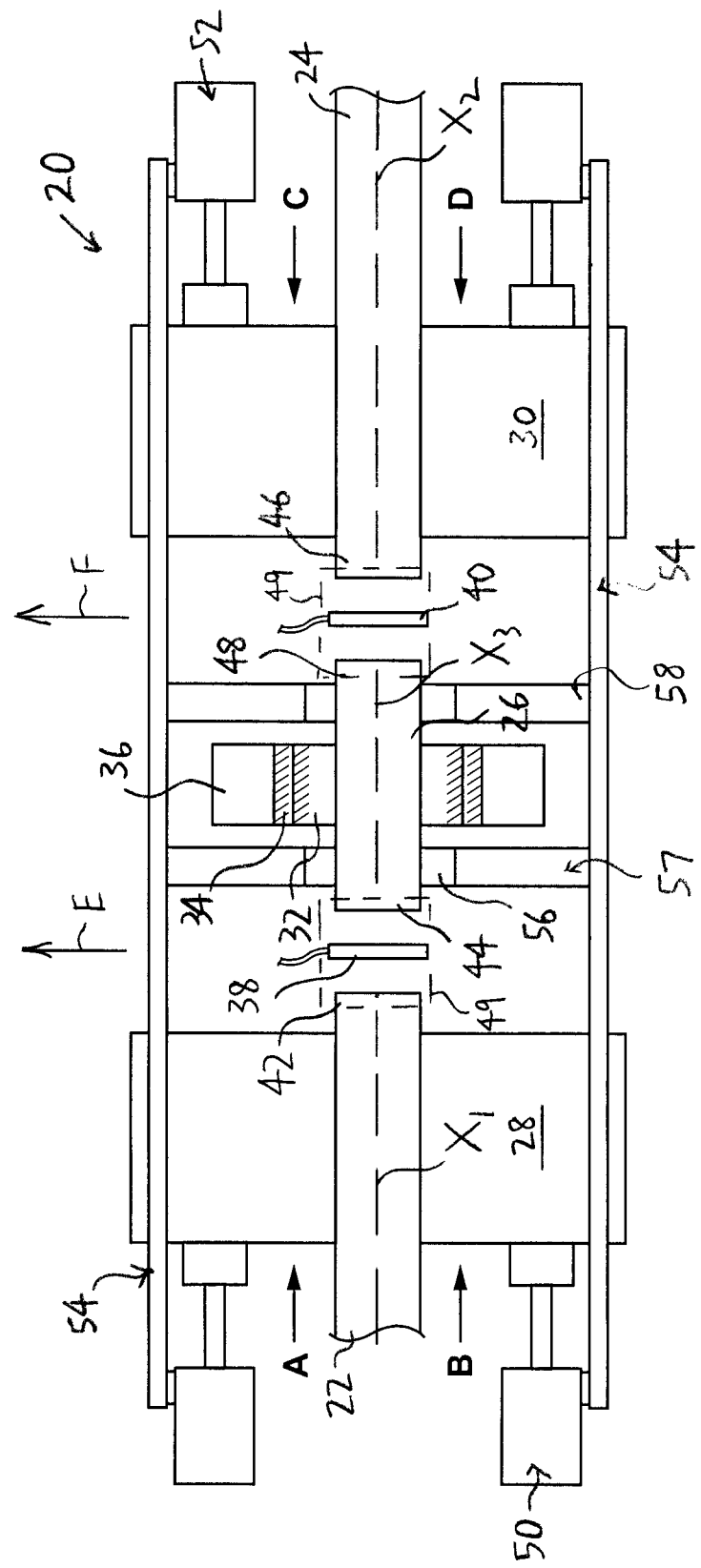
FIG. 1 is a top view of an embodiment of a system of the invention in which a central metal workpiece is positioned between first and second metal workpieces that are movable toward the central metal workpiece.
Figure 2:
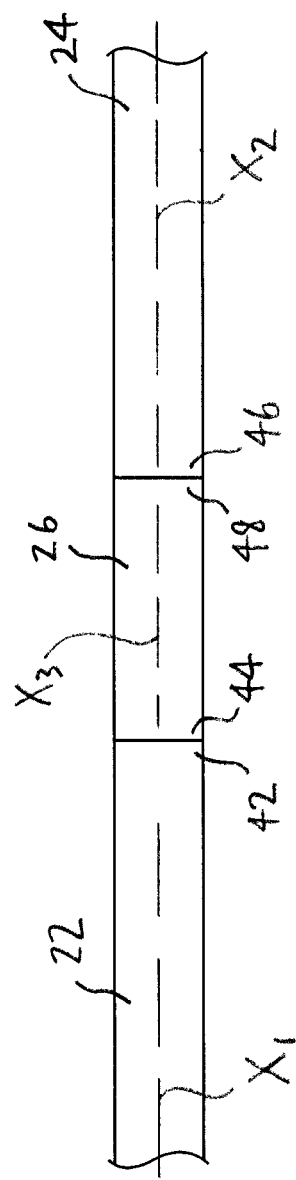
FIG. 2 is a top view of the first and second metal workpieces of FIG. 1, fused together with the central metal workpiece.

In the attached drawings, like reference numerals designate corresponding elements throughout. Reference is first made to FIGS. 1 and 2 to describe an embodiment of a system in accordance with the invention indicated generally by the numeral 20. The system 20 is for securing first and second metal workpieces 22, 24 defining first and second central axes thereof "$X_1$", "$X_2$" to a central metal workpiece 26 defining a central axis thereof "$X_3$" located between the first and second metal workpieces 22, 24.

The system 20 preferably includes first and second clamps 28, 30, securable to the first and second metal workpieces 22, 24 respectively. Preferably, the system 20 includes a central gear 32, securable to the central metal workpiece 26, a drive gear 34, meshably engagable with the central gear 32, and a motor 36, for rotating the central metal workpiece 26 about the central axis "$X_3$". It is also preferred that the system 20 includes first and second heating elements 38, 40, positionable respectively between (i) the first metal workpiece 22 and the central metal workpiece 26, and (ii) the second metal workpiece 24 and the central metal workpiece 26, for respectively heating (i) opposed ends 42, 44 of the first metal workpiece 22 and the central metal workpiece 26, and (ii) opposed ends 46, 48 of the second metal workpiece 24 and the central metal workpiece 26.

Preferably, the system 20 also includes one or more shielding subassemblies 49, for providing one or more non-oxidizing atmospheres enveloping the opposed ends 42, 44 of the first metal workpiece 22 and the central metal workpiece 26, and also for enveloping the opposed ends 46, 48 of the second metal workpiece 24 and the central metal workpiece 26. Those skilled in the art would be aware of suitable devices to provide non-oxidizing atmospheres.

As will be further described, the system preferably also includes one or more first ram subassemblies 50, for pushing the first metal workpiece 22 against the central metal workpiece 26, and one or more second ram subassemblies 52, for pushing the second metal workpiece 24 against the central metal workpiece 26. The system 20 preferably also includes one or more alignment subassemblies 54, for maintaining the first metal workpiece 22, the central metal workpiece 26, and the second metal workpiece 24 in coaxial alignment when the first and second metal workpieces 22, 24 are pushed against the central metal workpiece 26.

The first and second heating elements 38, 40 are removable once the opposed ends 42, 44 of the first metal workpiece 22 and the central metal workpiece 26, and the opposed ends 46, 48 of the second metal workpiece 24 and the central metal workpiece 26 are heated to a hot working temperature, and the first and second metal workpieces 22, 24 are then pushed against the central metal workpiece 26. Preferably, the opposed ends 42, 44 of the first metal workpiece 22 and the central metal workpiece 24, are twisted (i.e., at least one relative to the other) when engaged, to subject the opposed ends 42, 44 to shear stresses, for bonding the opposed ends 42, 44 together. Similarly, it is preferred that the opposed ends 46, 48 of the second metal workpiece 24 and the central metal workpiece 26 are twisted (i.e., at least one relative to the other) when engaged, to subject the opposed ends 46, 48 to shear stresses, for bonding the opposed ends 46, 48 together. To accomplish this, the central metal workpiece 26 is rotated about its axis before and immediately after the opposed ends 42, 44 engage each other, and before and immediately after the opposed ends 46, 48 engage each other.

The mechanisms utilized in fusing or bonding workpieces together as outlined above are not well understood. Advantageously, the bonded workpieces do not include heat-affected zones. It is believed that at least partial plastic deformation of the opposed ends 42, 44, and the opposed ends 46, 48, is needed to achieve at least partial uniformity of the microstructures (i.e., partial uniformity of grain sizes) of the opposed ends 42, 44, and also of the opposed ends 46, 48.

Preferably, the opposed ends 42, 44, and the opposed ends 46, 48, are permitted to cool to a predetermined temperature (e.g., ambient temperature, or room temperature) for recrystallization of the opposed ends 42, 44, and the opposed ends 46, 48, that are thereby bonded to each other respectively. Those skilled in the art would be aware of a temperature or range of temperatures at which recrystallization may take place.

The process whereby two metal elements may be bonded to each other after they have been heated to a hot working temperature was described in U.S. Pat. No. 9,644,769, which patent is hereby incorporated herein by reference.

Those skilled in the art would appreciate that the hot working temperature of the metal workpieces that are to be joined is a temperature above a recrystallization temperature of the metal, at which hot working temperature the metal may be plastically deformed. Those skilled in the art would also appreciate that, in each case, the most efficient energy input may be determined based on the metal. As is known in the art, the heating preferably is done by induction, and in a non-reactive (non-oxidizing) atmosphere. Shielding fluids may be used.

In use, the first and second metal workpieces 22, 24 and the central metal workpiece 26 are coaxially positioned. The first and second clamps 28, 30 are secured to the first and second metal workpieces 22, 24 respectively. The central gear 32 is secured to central metal workpiece 26, and the drive gear 34 is engaged with the central gear 32. The motor 36 is operably connected with the drive gear 34. It will be understood that the drive gear 34 is driven by the motor 36 so that the central gear 32 is driven to rotate about the axis "$X_3$". Because the central gear 32 is secured to the central metal workpiece 26, such rotation causes the central metal workpiece 26 to rotate about the central metal workpiece axis "$X_3$".

It will be understood that the first and second clamps 28, 30 are intended to hold the non-rotating first and second workpieces 22, 24 in predetermined coaxial relationships to the central metal workpiece 26.

In one embodiment, the system 20 preferably also includes rollers or bearings 56 mounted on arms 57 that are intended to keep the central metal workpiece 26 coaxial with each of the first and second metal workpieces 22, 24. Preferably, the arms 57 are mounted to the alignment subassemblies 54, at outer ends 58 of the arms 57.

The heating elements 38, 40 are connected to power sources (not shown), so that, when the heating elements 38, 40 are in position, they are energized, and heat the opposed ends of the workpieces.

Those skilled in the art would appreciate that the heating elements 38, 40 may be used to heat the ends of the workpieces proximal thereto to different hot working temperatures respectively, if necessary. This may be done, for example, where the first and second metal workpieces 22, 24 are made of two different metals. For the purposes hereof, it will be understood that the term "metal" may refer to metals and/or alloys thereof.

The heating elements 38, 40 may be in any suitable form. It will be understood that the heating elements are configured for substantially uniform inductive heating of the ends of the workpieces that are proximal thereto, and heated thereby. Due to space constraints, the heating element may be brought to the work space in which the workpieces are located in a number of discrete parts, and assembled in situ.

For example, the first heating element 38 is positioned between the end 42 of the first workpiece, and the end 44 of the central metal workpiece. The other heating element 40 is positioned between the end 46 of the second workpiece, and the end 48 of the central metal workpiece 26. The first heating element 38 heats the ends 42, 44 to the hot working temperature, and similarly, the second heating element 40 heats the ends 46, 48 to the hot working temperature. While such heating is taking place, the central metal workpiece 26 is rotated about its axis "$X_3$", as described above.

Once the ends 42, 44 and 46, 48 are at the hot working temperature, the first and second heating elements 38, 40 are removed, by being moved in the directions indicated by arrows "E" and "F" respectively, and shortly thereafter, the workpieces are pushed together.

Specifically, the first ram subassembly is energized, to push the first metal workpiece 22 in the direction indicated by arrows "A" and "B", to cause the end 42 of the first metal workpiece 22 to engage the end 44 of the rotating central metal workpiece 26. At the same time, the second ram subassembly 52 pushes the second metal workpiece 24 in the direction indicated by arrows "C" and "D", to engage the end 46 with the end 48 of the rotating central metal workpiece 26. The movement of the first and second workpieces 22, 24 is guided by the alignment subassembly 54, in order to keep the first and second workpieces in coaxial relationship with the central metal workpiece 26, as the first and second workpieces 22, 24 are moved.

The resulting assembly is illustrated in FIG. 2, in which the first workpiece 22 and the central metal workpiece 26 are fused together, and the second workpiece 24 and the central metal workpiece 26 are also fused together, at heir respective opposed ends.

It will be understood that multiples of elements (i.e., more than illustrated, and described) may be utilized, in practice. For example, in view of the relatively large forces involved, more than one motor (and more than one set of gears) may be utilized, to rotate the central metal workpiece 26. More rams than the two rams 50 and the other two rams 52 that are illustrated in FIG. 1 may be utilized. The central metal workpiece 26 may be held in place as it rotates by any suitable number of arms 57 with bearings 56 thereon.

Those skilled in the art would appreciate that certain of the elements illustrated in FIG. 1 are stationary, and secured to other elements (not shown). For example, the motor 36 is anchored, so that it is stationary.

It will be understood that the elements of the system 20 as illustrated may be assembled in situ. This may be necessary, for example, where the first and second workpieces 22, 24 and the central metal workpiece 26 are located in a confined space. As an example, each of the clamps 28, 30 may be made of discrete parts (not shown) that are only assembled into the clamp when the parts are positioned on or proximal to the workpiece on which the clamp is mounted.

Those skilled in the art would also appreciate that, in certain circumstances, axial movement of one of the first or second metal workpieces may not be feasible. For example, one of the first and second metal workpieces may form part of a manifold, to which other tubes are connected, for ultimate connections with other elements. An alternative embodiment of the system 120 of the invention, illustrated in FIG. 3, is intended to address such circumstances.

The system 120 is for securing first and second metal workpieces 122, 124 defining first and second central axes thereof "$2X_1$", "$2X_2$" to a central metal workpiece 126 defining a central axis thereof "$2X_3$" located between the first and second metal workpieces 122, 124. It will be understood that, in FIG. 3, the second metal workpiece 124 is not movable in the axial direction.

The system 120 preferably includes first and second clamps 128, 130, securable to the first and second metal workpieces 122, 124 respectively. Preferably, the system 120 includes a central gear 132, securable to the central metal workpiece 126, a drive gear 134, meshably engagable with the central gear 132, and a motor 136, for rotating the central metal workpiece 126 about the central axis "$2X_3$". It is also preferred that the system 120 includes first and second heating elements 138, 140, positionable respectively between (i) the first metal workpiece 122 and the central metal workpiece 126, and (ii) the second metal workpiece 124 and the central metal workpiece 126, for respectively heating (i) opposed ends 142, 144 of the first metal workpiece 122 and the central metal workpiece 126, and (ii) opposed ends 146, 148 of the second metal workpiece 124 and the central metal workpiece 126.

Figure 3:
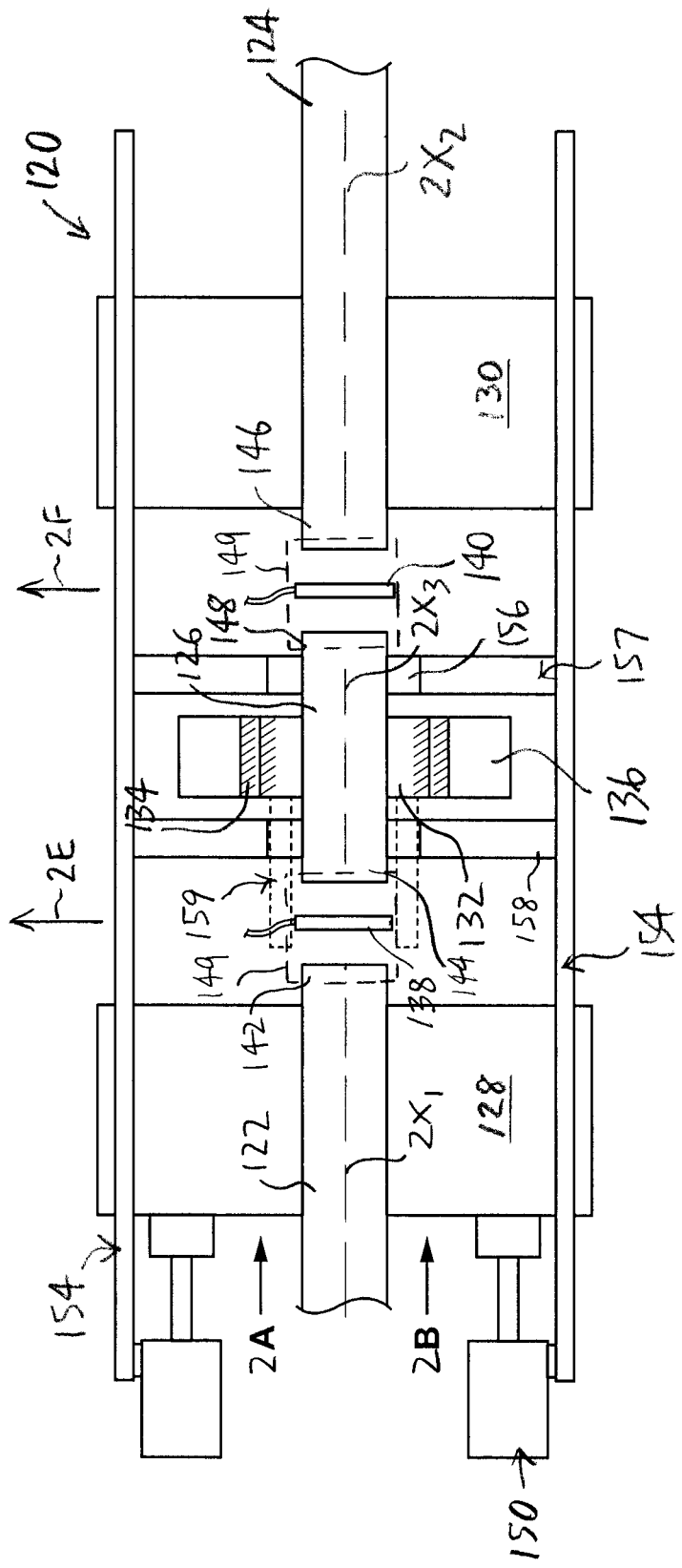
FIG. 3 is a top view of another embodiment of the system of the invention in which a central metal workpiece is positioned between first and second metal workpieces.

As can be seen in FIG. 3, the system 120 preferably also includes one or more first ram subassemblies 150, for pushing the first metal workpiece 122 against the central metal workpiece 126, i.e., in the direction indicated by arrows "2A" and "2B". Preferably, the system 120 also includes a central ram subassembly 159, for pushing the central metal workpiece 126 against the second metal workpiece 124, i.e., also in the direction indicated by arrows "2A" and "2B".

The system 120 preferably also includes one or more alignment subassemblies 154, for maintaining the first metal workpiece 122, the central metal workpiece 126, and the second metal workpiece 124 in coaxial alignment when the first metal workpiece 122 is pushed against the central metal workpiece 126, and when the central metal workpiece 126 is pushed against the second metal workpiece 124.

The system 120 preferably also includes arms 157 that are respectively slidably engaged with the alignment subassemblies 154, at the outer ends 158 of the arms 157. Bearings or rollers 156 are mounted on the arms 157, to engage the central metal workpiece 126 as it is rotated, to maintain the central metal workpiece 126 in coaxial alignment with the first and second workpieces 122, 124.

Preferably, the central metal workpiece 126 is rotated about its axis "$2X_3$", and the heating elements 138, 140 are energized, to heat the ends 142, 144 and 146, 148 to at least the predetermined temperature.

The system 120 preferably also includes one or more shielding subassemblies 149, for providing one or more non-oxidizing atmospheres covering the opposed ends.

The first and second heating elements 138, 140 are removable once the opposed ends 142, 144 of the first metal workpiece 122 and the central metal workpiece 126, and the opposed ends 146, 148 of the second metal workpiece 124 and the central metal workpiece 126 are heated to a hot working temperature. The first and second heating elements 138, 140 are then removed, in the directions indicated by arrows "2E" and "2F". Also at that time, while the opposed ends are at the hot working temperature, the first metal workpiece 122 is pushed against the central metal workpiece 126 by the first ram subassembly 150, to fuse therewith. Similarly, at substantially the same time, the central metal workpiece 126 is pushed against the second workpiece 124 by the central ram subassembly 159. Preferably, the opposed ends that are engaged with each other are also subjected to plastic deformation while so engaged, by movement of at least one opposite end relative to the other, so that the opposed ends are subjected to shear stresses, as described above.

To accomplish this, the central metal workpiece 126 is rotated about its axis before and immediately after the opposed ends 142, 144 engage each other, and before and immediately after the opposed ends 146, 148 engage each other.

The first and second metal workpieces and the central workpiece are allowed to cool to a predetermined temperature (e.g., ambient or room temperature), so that recrystallization takes place.

Figure 4:
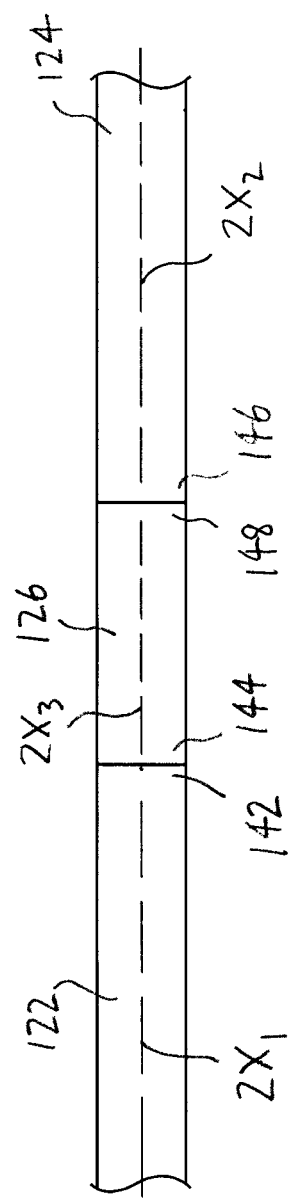
FIG. 4 is a top view of the first and second metal workpieces of FIG. 3, fused together with the central metal workpiece.

The resulting assembly is illustrated in FIG. 4, in which the first workpiece 122 and the central metal workpiece 126 are fused together, and the second workpiece 124 and the central metal workpiece 126 are also fused or bonded together, at their respective opposed ends.

Those skilled in the art would appreciate that certain of the elements illustrated in FIG. 3 are stationary, and secured to other elements (not shown). For example, the motor 136, and the central ram subassembly 159, are anchored.

It will be understood that the elements of the system 120 as illustrated may be assembled in situ, e.g., where the first and second workpieces 122, 124 and the central metal workpiece 126 are located in a confined space.

Figure 5:
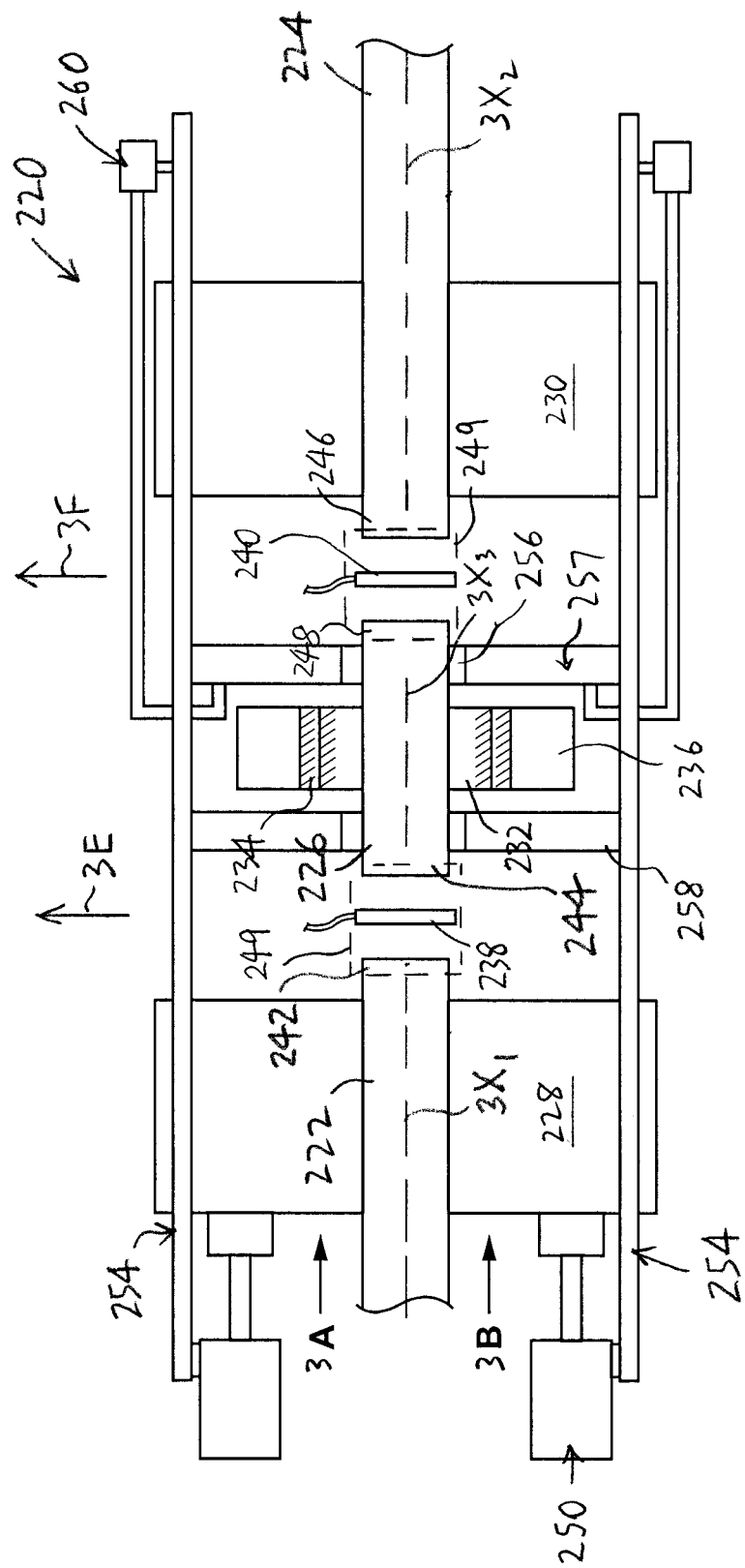
FIG. 5 is a top view of another embodiment of the system of the invention in which a central metal workpiece is positioned between first and second metal workpieces.

Another alternative embodiment of the system 220 is illustrated in FIG. 5. It will be understood that, in FIG. 5, axial movement of a second workpiece 224 is not feasible.

The system 220 is for securing a first and the second metal workpieces 222, 224 defining first and second central axes thereof "$3X_1$", "$3X_2$" to a central metal workpiece 226 defining a central axis thereof "$3X_3$" located between the first and second metal workpieces 222, 224.

The system 220 preferably includes first and second clamps 228, 230, securable to the first and second metal workpieces 222, 224 respectively. Preferably, the system 220 includes a central gear 232, securable to the central metal workpiece 226, a drive gear 234, meshably engagable with the central gear 232, and a motor 236, for rotating the central metal workpiece 226 about the central axis "$3X_3$". It is also preferred that the system 220 includes first and second heating elements 238, 240, positionable respectively between (i) the first metal workpiece 222 and the central metal workpiece 226, and (ii) the second metal workpiece 224 and the central metal workpiece 226, for respectively heating (i) opposed ends 242, 244 of the first metal workpiece 222 and the central metal workpiece 226, and (ii) opposed ends 246, 248 of the second metal workpiece 224 and the central metal workpiece 226.

The system 220 preferably also includes one or more shielding subassemblies 249, for providing one or more non-oxidizing atmospheres covering the opposed ends.

As can be seen in FIG. 5, the system 220 preferably also includes one or more first ram subassemblies 250, for pushing the first metal workpiece 222 against the central metal workpiece 226, i.e., in the direction indicated by arrows "3A" and "3B". Preferably, the system 220 also includes a central ram subassembly 260, for pulling the central metal workpiece 226 against the second metal workpiece 224, i.e., also in the direction indicated by arrows "3A" and "3B".

The system 220 preferably also includes one or more alignment subassemblies 254, for maintaining the first metal workpiece 222, the central metal workpiece 226, and the second metal workpiece 224 in coaxial alignment when the first metal workpiece 222 is pushed against the central metal workpiece 226, and when the central metal workpiece 226 is pulled against the second metal workpiece 224.

The system 220 preferably also includes arms 257 that are respectively slidably engaged with the alignment subassemblies 254, at the outer ends 258 of the arms 257. Bearings or rollers 256 are mounted on the arms 257, to engage the central metal workpiece 226 as it is rotated, to maintain the central metal workpiece 226 in coaxial alignment with the first and second workpieces 222, 224.

The central ram subassembly 260 may be connected to the central metal workpiece 226, directly or indirectly, in any suitable manner. In FIG. 5, the central ram subassembly 260 is shown as being connected with one or more of the arms 257.

Preferably, the central metal workpiece 226 is rotated about its axis "3X$_3$", and the heating elements 238, 240 are energized, to heat the ends 242, 244 and 246, 248 to at least the predetermined temperature.

The first and second heating elements 238, 240 are removable once the opposed ends 242, 244 of the first metal workpiece 222 and the central metal workpiece 226, and the opposed ends 246, 248 of the second metal workpiece 224 and the central metal workpiece 226 are heated to a hot working temperature. The first and second heating elements 238, 240 are then removed, in the directions indicated by arrows "3E" and "3F". Also at that time, and while the opposed ends are at the hot working temperature, the first metal workpiece 222 is pushed against the central metal workpiece 226 by the first ram subassembly 250, to fuse therewith. Similarly, at substantially the same time, the central metal workpiece 226 is pulled against the second workpiece 224 by the central ram subassembly 260. It is preferred that, once engaged, at least one of the opposed ends is moved relative to the other of the opposed ends engaged therewith, to subject the opposed ends to shear stresses, as described above.

To accomplish this, the central metal workpiece 226 is rotated about its axis before and immediately after the opposed ends 242, 244 engage each other, and before and immediately after the opposed ends 246, 248 engage each other.

The first and second metal workpieces and the central workpiece are allowed to cool to a predetermined temperature (e.g., ambient or room temperature), so that recrystallization takes place.

Figure 6:
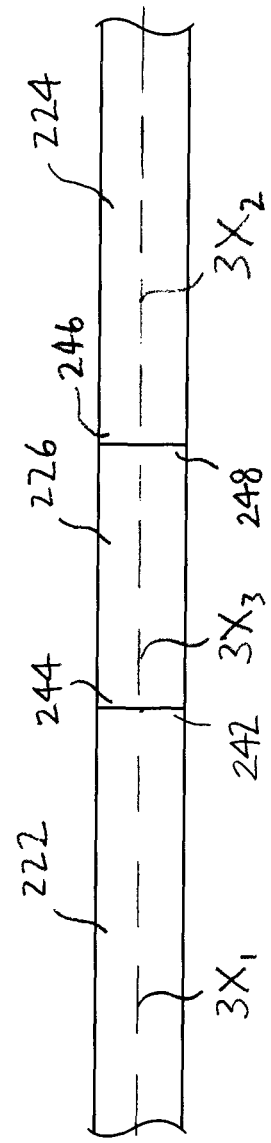
FIG. 6 is a top view of the first and second metal workpieces of FIG. 5, fused together with the central metal workpiece.

The resulting assembly is illustrated in FIG. 6, in which the first workpiece 222 and the central metal workpiece 226 are fused together, and the second workpiece 224 and the central metal workpiece 226 are also fused or bonded together, at their respective opposed ends.

Those skilled in the art would appreciate that certain of the elements illustrated in FIG. 5 are stationary, and secured to other elements (not shown). For example, the motor 236, and the central ram subassembly 260, are anchored.

It will be understood that the elements of the system 220 as illustrated may be assembled in situ, where the first and second workpieces 222, 224 and the central metal workpiece 226 are located in a confined space.

Those skilled in the art would also appreciate that the movement of the central metal workpiece in the axial direction, in the embodiments illustrated in FIGS. 3-5, may be accomplished via any suitable means. For example, in an alternative arrangement, the axial movement may be effected via electromagnets activated when needed, to generate electromagnetic fields to push and/or pull the central metal workpiece 126, 226 against the first workpiece 124, 224.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A system for securing first and second metal workpieces defining first and second central axes thereof to a central metal workpiece defining a central axis thereof located between the first and second metal workpieces to form an assembly in a confined space defined by at least one stationary element, the system comprising:
    first and second clamps, securable to the first and second metal workpieces respectively;
    a central gear, securable to the central metal workpiece;
    a drive gear, meshably engagable with the central gear;
    a motor secured to said at least one stationary element, for rotating the central metal workpiece about the central axis;
    first and second heating elements, positionable respectively between (i) the first metal workpiece and the central metal workpiece, and (ii) the second metal workpiece and the central metal workpiece, for respectively heating (i) opposed ends of the first metal workpiece and the central metal workpiece, and (ii) opposed ends of the second metal workpiece and the central metal workpiece, to a hot working temperature at which the opposed ends of the first and second ends are plastically deformable;
    at least one shielding subassembly, for providing at least one non-oxidizing atmosphere enveloping the opposed ends of the first metal workpiece and the central metal workpiece and the opposed ends of the second metal workpiece and the central metal workpiece;
    at least one first ram subassembly, for pushing the first metal workpiece against the central metal workpiece;
    at least one central ram subassembly, for pushing the central metal workpiece against the second metal workpiece;
    at least one alignment subassembly, for maintaining the first metal workpiece, the central metal workpiece, and the second metal workpiece in coaxial alignment when the first and second metal workpieces are pushed against the central metal workpiece;
    at least one arm (157) comprising an outer end (158) thereof that is slidably engaged with said at least one alignment subassembly (154); and
    a plurality of bearings (156) mounted on said at least one arm (157) for engagement with the central metal workpiece (126) as the central metal workpiece (126) is rotated, to maintain the central metal workpiece (126) in coaxial alignment with the first and second workpieces,
    wherein the first and second heating elements are removable once the opposed ends of the first metal workpiece and the central metal workpiece, and the second metal workpiece and the central metal workpiece, are heated to the hot working temperature, and the first metal workpiece is then pushed against the rotating central metal workpiece, and at the same time the central metal workpiece is pushed against the second metal workpiece, subjecting the first and second metal workpieces and the central metal workpiece to plastic deformation and shear stresses, for bonding the opposed ends of the first metal workpiece and the central metal workpiece together, and for bonding the opposed ends of the second metal workpiece and the central metal workpiece together to form the assembly in the confined space.

2. A method of securing first and second metal workpieces (122, 124) defining first and second central axes thereof to a central metal workpiece (126) defining a central axis thereof positioned between the first and second metal workpieces and located in a confined space defined by at least one stationary element, to provide an assembly in the confined space, the method comprising:
- (a) securing a motor (136) to said at least one stationary element;
- (b) securing a central gear (132) to the central metal workpiece (126);
- (c) meshably engaging a drive gear (134) rotatable by the motor with the central gear;
- (d) providing at least one alignment subassembly (154) in the confined space;
- (e) mounting at least one first ram subassembly (150) to said at least one alignment subassembly (154);
- (f) mounting at least one central ram subassembly (159) to said at least one alignment subassembly (154);
- (g) securing the first workpieces (122) to said at least one first ram subassembly (150) and securing the central ram subassembly (159) respectively;
- (h) providing at least one arm (157) comprising an outer end (158) that is slidably engaged with said at least one alignment subassembly (154);
- (i) providing a plurality of bearings (156) mounted on said at least one arm (157);
- (j) engaging the bearings (156) with the central metal workpiece (126);
- (k) positioning the first and second metal workpieces (122, 124) coaxially relative to each other and positioning the central metal workpiece (126) coaxially therebetween, to locate ends (142, 144) of the first metal workpiece (122) and the central metal workpiece (126) opposite to each other and spaced apart from each other, and to locate the ends (146, 148) of the second metal workpiece (124) and the central metal workpiece (126) spaced apart from each other;
- (l) positioning first and second heating elements (138, 140) respectively between (i) respective ends (142, 144) of the first metal workpiece and the central metal workpiece, and (ii) respective ends (146, 148) of the second metal workpiece and the central metal workpiece, for respectively heating (i) the opposed ends (142, 144) of the first metal workpiece and the central metal workpiece, and (ii) the opposed ends (146, 148) of the second metal workpiece and the central metal workpiece to a hot working temperature;
- (m) providing at least one non-oxidizing atmosphere enveloping the opposed ends of the first metal workpiece and the central metal workpiece and the opposed ends of the second metal workpiece and the central metal workpiece, said at least one non-oxidizing atmosphere being held in position by at least one shielding assembly (149);
- (n) energizing the first and second heating elements, for heating the respective ends (142, 144) of the first metal workpiece (122) and the central metal workpiece (126) and the respective ends (146, 148) of the second metal workpiece (124) and the central metal workpiece (126) to a hot working temperature;
- (o) energizing the motor, to rotate the central metal workpiece about its axis; and
- (p) while the ends (142, 144) of the first metal workpiece and the central metal workpiece are at the hot working temperature, while the ends (146, 148) of the second metal workpiece and the central metal workpiece are at the hot working temperature, and while the central metal workpiece (126) rotates about the axis thereof, with said at least one first ram subassembly, pushing the end (142) of the first metal workpiece against the end (144) of the central metal workpiece, and at the same time, with said at least one central ram subassembly (159), pushing the end (148) of the central metal workpiece against the end (146) of the second metal workpiece (124), to form the assembly in the confined space.

* * * * *